(12) United States Patent
Tokarski et al.

(10) Patent No.: US 12,508,788 B2
(45) Date of Patent: Dec. 30, 2025

(54) METHODS, APPARATUSES, AND SYSTEMS FOR EDGE SEALING LAMINATE WAFERS CONTAINING A SOFT DEFORMABLE INNER FILM

(71) Applicant: Essilor International, Charenton-le-Pont (FR)

(72) Inventors: Zbigniew Tokarski, Dallas, TX (US); Eric Begg, Dallas, TX (US); Ahmed Drammeh, Dallas, TX (US); Hao-Wen Chiu, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/502,470

(22) Filed: Nov. 6, 2023

(65) Prior Publication Data
US 2024/0075698 A1 Mar. 7, 2024

Related U.S. Application Data

(62) Division of application No. 17/120,638, filed on Dec. 14, 2020, now Pat. No. 11,833,772.

(30) Foreign Application Priority Data

Dec. 17, 2019 (EP) .................................... 19306667

(51) Int. Cl.
*B29D 11/00* (2006.01)
*B29B 11/02* (2006.01)
(Continued)

(52) U.S. Cl.
CPC .......... *B29D 11/0048* (2013.01); *B29B 11/02* (2013.01); *B29K 2101/12* (2013.01); *G02C 7/02* (2013.01); *G02C 2202/16* (2013.01)

(58) Field of Classification Search
CPC ....... B29D 11/0048; B29B 11/02; G02C 7/02; G02C 2202/16; B29K 2101/12
See application file for complete search history.

(56) References Cited

U.S. PATENT DOCUMENTS 4,074,721 A * 2/1978 Smits .................... A61F 13/141
604/377
2004/0125337 A1 7/2004 Boulineau et al.
(Continued)

FOREIGN PATENT DOCUMENTS

WO 0012291 A1 3/2000
WO 2015030081 A1 3/2015

OTHER PUBLICATIONS

European Extended Search Report for 19306667.7 dated Jun. 10, 2020, 9 pages.

*Primary Examiner* — Mathieu D Vargot
(74) *Attorney, Agent, or Firm* — NIXON & VANDERHYE

(57) ABSTRACT

The present disclosure includes systems, apparatuses, and methods for an optical system. In some aspects, the systems and devices may produce a wafer for use in the manufacture of an optical article. The wafer includes a laminate having a first layer that includes a first matrix material having a lower surface and an upper surface opposite the lower surface and a second layer that includes a second matrix material, the second layer is coupled to the first layer and covers at least a portion of the lower surface or the upper surface. The first layer includes a first thickness at a central portion that is greater than a second thickness at an edge portion.

5 Claims, 7 Drawing Sheets

(51) Int. Cl.
  *B29K 101/12* (2006.01)
  *G02C 7/02* (2006.01)

(56) References Cited

U.S. PATENT DOCUMENTS

2012/0262665 A1  10/2012  Boinard et al.
2017/0322344 A1  11/2017  Yoshida et al.

\* cited by examiner

METHODS, APPARATUSES, AND SYSTEMS FOR EDGE SEALING LAMINATE WAFERS CONTAINING A SOFT DEFORMABLE INNER FILM

CROSS REFERENCE TO RELATED APPLICATIONS

This application is a Divisional of application Ser. No. 17/120,638, filed on Dec. 14, 2020, now U.S. Pat. No. 11,833,772, which claims priority under 35 U.S.C. § 119(a) to application Ser. No. 19/306,667.7, filed in Europe on Dec. 17, 2019, all of which are hereby expressly incorporated by reference into the present application.

TECHNICAL FIELD

The present disclosure relates generally to optical article and, more particularly but without limitation, to the manufacture of optical articles for use with an eyewear apparatus.

BACKGROUND

Optical articles, such as lenses, are typically made by functional wafers. Theses wafers may be subject to various manufacturing processes during the formation of an optical article. For example, flat wafers are typically transformed (e.g., thermoformed) from a flat circular wafer to a concave dome-shaped functional wafer to correspond to a base curve of the optical article. The thermoformed functional wafers are then often used in an injection overmolding process to produce corrective or non-corrective eyeglass lenses. Often, the wafer includes a thick center layer of soft thermoplastic material (e.g., soft thermoplastic layer or soft adhesive layer) as it offers certain advantages, such as soft polymer segment, ductility, and chemical compatibility during the formation of the wafers and optical articles. However, there are several complications that arise from using the soft thermoplastic layer in both thermoforming and injection molding processes.

To illustrate, to maintain the desired ductility of the wafer, the soft thermoplastic layer of the wafer typically has a glass transition temperature well below that of the injection molding temperature that results in outflow (e.g., edge bleeding) of the soft layer. This edge bleeding creates unwanted contamination of the insert, mold cavity and/or space between the outer side surface of the insert and the mold cavity walls. This contamination may prevent removal of the insert from the mold block and/or create buildup of unwanted material on the molding surfaces which affects product yields, increases down time due to mold cleaning, and leads to imperfections in subsequent lens formation such as, for example, non-uniform thickness of the soft thermoplastic layer which may result in optical distortions or cosmetic issues in the lenses. Some conventional approaches to preventing edge bleeding have included using outer layers that have a larger diameter than the soft, central layer to prevent the central layer from bleeding into the mold cavity. However, such wafer geometry is difficult to produce on a large scale and the soft layer is still visible after injection molding. Accordingly, such solutions offer little help in reducing manufacturing time and produce lenses with undesirable cosmetic properties.

SUMMARY

The present disclosure is generally related to systems, devices, and methods for manufacturing an optical article. For example, a method of manufacturing an optical article may include sealing and cutting a laminate to form a functional wafer. Sealing the laminate may include liquefying at least a portion of a thermoplastic layer of a laminate and displacing the liquefied portion of the thermoplastic layer to produce a wafer having an inner layer that includes a central portion having a first thickness that is greater than a second thickness at an edge portion of the inner layer. The reduced thickness of the inner layer at the edge portion of the wafer may prevent molten material from bleeding out of the wafer during subsequent manufacturing steps to produce the optical article. In another example, a system may include one or more tools for producing a non-contaminating optical wafer for use in manufacture of the optical article. The one or more tools may include an imprinting apparatus and a cutting apparatus. To illustrate, the imprinting apparatus is configured to form an imprint in the laminate and the cutting apparatus is configured to cut out wafers from the laminate. In this way, imprinting apparatus and cutting apparatus may operate in conjunction to efficiently produce a plurality of non-contaminating wafers in a timely and reproducible manner. In some implementations, the imprinting apparatus may operate on a laminate prior to operation of the cutting apparatus on the laminate. In other implementations, the cutting apparatus may operate on a laminate to form a wafer prior to an operation of the imprinting apparatus on the wafer. Consequently, the disclosed system, apparatuses, and methods enable mass production of a non-contaminating optical wafer capable of preventing edge bleed and subsequent contamination of the mold cavity without sacrificing the cosmetic appearance of the lenses.

In some of the foregoing implementations of the present methods (e.g., of forming a wafer for use in an optical article), a method includes liquefying at least a portion of a thermoplastic layer of a laminate. The method also includes displacing the liquefied portion of the thermoplastic layer. The method further includes cutting a wafer from the laminate. In some such implementations, liquefying the at least the portion of the thermoplastic layer of the laminate may include heating the at least the portion of a thermoplastic layer of the laminate. Additionally, or alternatively, cutting the wafer may include cutting the laminate to define an outer edge of the wafer.

In some such implementations of the present methods, cutting the wafer may occurs subsequent to displacing the liquefied portion of the thermoplastic layer. Additionally, or alternatively, displacing the liquefied portion of the thermoplastic layer may include compressing the portion of the thermoplastic layer of the laminate. In some implementations, compressing the portion of the thermoplastic layer of the laminate may displace the liquefied portion in a direction outward from a center of the wafer.

In some such implementations of the present methods, the method further includes sealing a sidewall of the wafer. Additionally, or alternatively, cutting the wafer from the laminate may occur prior to liquefying the at least the portion of a thermoplastic layer of the laminate. In some implementations, the method may also include thermoforming the wafer, and placing the thermoformed wafer into a mold cavity to form an optical article.

In some of the foregoing implementations of the present apparatuses (e.g., wafers of an optical article), a wafer includes a laminate. The laminate includes a first layer and a second layer. The first layer includes a first matrix material having a lower surface and an upper surface opposite the lower surface. The second layer includes a second matrix material and the second layer is coupled to the first layer and covers at least a portion of the lower surface or the upper surface. A first thickness at a central portion of the first layer that is greater than a second thickness at an edge portion of the first layer. In some such implementations, a glass transition temperature of the first matrix material may be lower than a glass transition temperature of the second matrix material. Additionally, or alternatively, the first matrix material may include a thermoplastic polyurethane (TPU) resin material.

In some such implementations of the present apparatuses, the second layer covers at least a portion of the lower surface. Additionally, or alternatively, the laminate may further include a third layer having a third matrix material. For example, the third layer may be coupled to the first layer and cover at least a portion of the upper surface. In some implementations, the second matrix material, the third matrix material, or both the second and third matric materials include polycarbonate.

In some of the foregoing implementations of the present systems (e.g. for forming an optical wafer), a system includes an imprinting apparatus configured to imprint an outline of a wafer on a laminate sheet. The imprinting apparatus includes a sealing band configured to heat and compress an edge portion of a wafer. The system further includes a cutting apparatus configured to cut the wafer from the laminate sheet. In some such implementations, the sealing band may define an angled surface that is configured to direct a portion of a thermoplastic layer of the wafer from the edge portion of the wafer.

In some such implementations of the present systems, the sealing band is configured to define an annular imprint in the laminate sheet. The annular imprint may have a first diameter. Additionally, or alternatively, the cutting apparatus may include a die cutter configured to cut through the laminate sheet at the annular imprint to define an edge surface of the wafer.

In some of the foregoing implementations of the present apparatuses (e.g., tools for sealing a wafer with a thermoplastic layer for use in an optical article), a tool includes a first insert and a second insert. The first insert includes a first inner surface configured to contact a first surface of a wafer. The first inner surface defines a first opening of a first cavity configured to receive a first portion of a wafer. The second inner surface is configured to contact a second surface of the wafer. The second inner surface defines a second opening of a second cavity configured to receive a second portion of a wafer. During a sealing operation, the first insert and the second insert are configured to: apply heat, pressure, or both to the wafer; and reduce a thickness of a layer of the wafer positioned between the first inner surface of the first insert and the second inner surface of the second insert.

In some such implementations of the present apparatuses, the first inner surface defines: a first sidewall having a first diameter; a second sidewall having a second diameter that is greater than the first diameter; and a ledge extends between the first sidewall and the second sidewall. Additionally, or alternatively, the second inner surface may define a third sidewall having a third diameter that is substantially equal to the first diameter. In some such implementations, the second insert may further include an outer surface that has a fourth diameter that is substantially equal to the second diameter. In some implementations, during the sealing operation: the first surface of the wafer is in contact with the ledge; and the first and second insert are configured to compress an outer edge portion of the wafer to reduce the thickness of the layer of the wafer at the outer edge portion.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, and 10 percent.

The term "about" as used herein can allow for a degree of variability in a value or range, for example, within 10%, within 5%, or within 1% of a stated value or of a stated limit of a range and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where". Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

DETAILED DESCRIPTION

Figure 1:
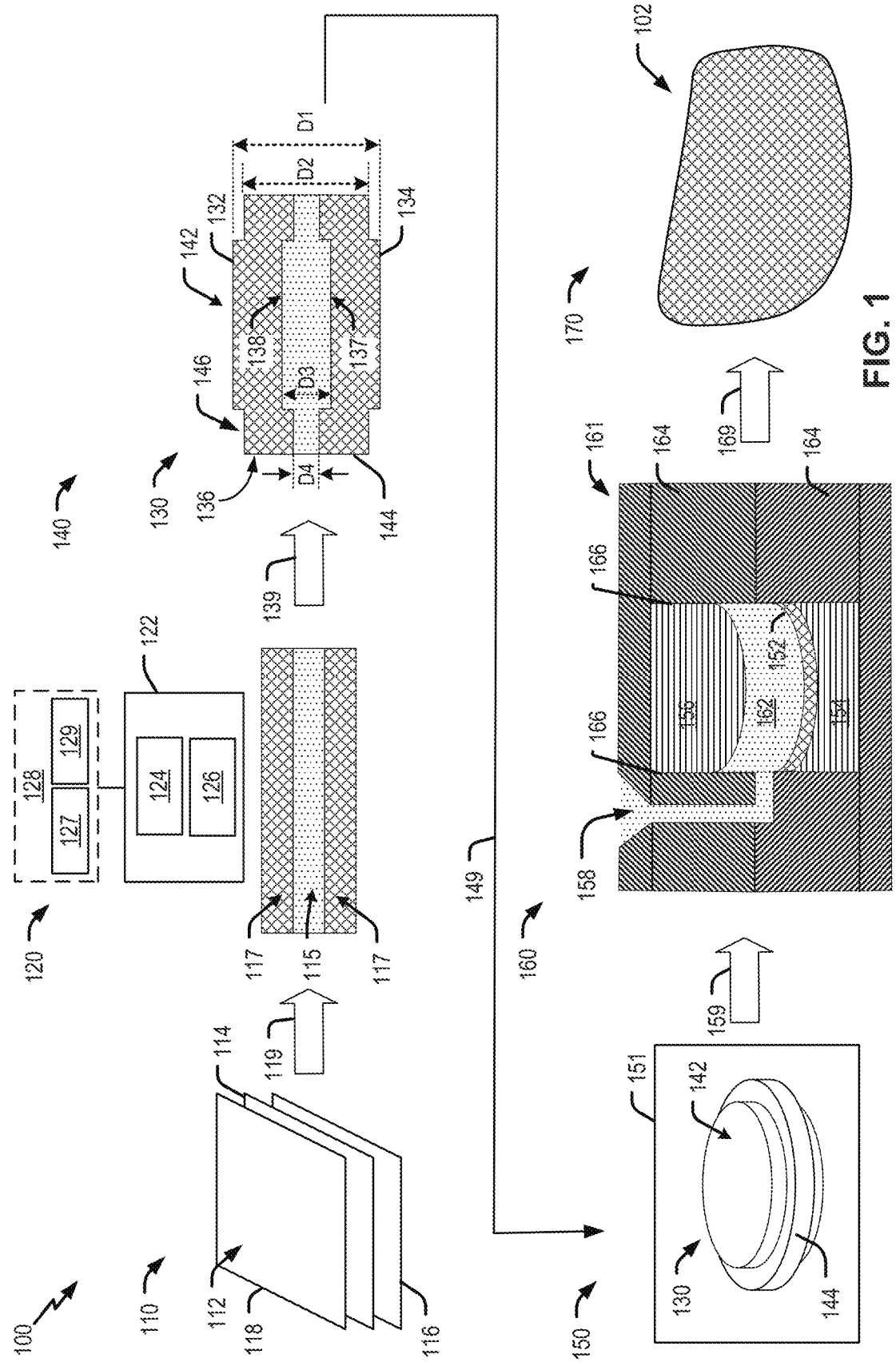
FIG. 1 is a diagram that illustrates an example of stages of a process of an optical system for manufacturing an optical article.

Referring to FIG. 1, a diagram of illustrative stages of a system for manufacturing an optical article, such as an optical lens (e.g., a semi-finished (SF) lens product), is shown and generally designated 100. System 100 may be configured to produce a non-contaminating optical wafer for use in manufacture of the optical article.

At a first stage 110, a laminate 112 having one or more layers may be provided or formed. Each layer of laminate 112 may include a thermoplastic material consolidated (e.g., by pressure and/or temperature) to form a stack. As shown in FIG. 1, laminate 112 includes an inner layer 114 and one or more outer layers 116 that each cover at least a portion of the inner layer. For example, a first outer layer (e.g., 116) may be disposed on a top surface of inner layer 114 and a second outer layer (e.g., 118) may be disposed on a bottom surface of the inner layer. Inner layer 114 and outer layers 116, 118 may be coupled together in any suitable manner such as, for example, via an adhesive layer (e.g., through adhesive lamination, adhesive coating lamination, or the like), without an adhesive layer (e.g., extrusion lamination), or any other known process.

Inner layer 114 may include a first matrix material 115. In some implementations, first matrix material 115 includes an optically functional thermoplastic elastomeric film such as, for example, a thermoplastic polyurethane ("TPU") (e.g., amorphous TPU, Tecoflex EG85A, Tecoflex EG80A, Estane ALR E77A-V, Estane AG 8451, Estane VSN F5000, or the like), a semi-crystalline Polyether-block-polyamides (PEBA) (e.g., Pebax 5533, Pebax 4533, Pebax 4033, Pellethane 80A or the like), a soft adhesive layer, or any other thermoplastic elastomeric material. In some implementations, one or more additives may be included within matrix material 115. For example, an optical additive and/or a process additive (e.g., photochromic dye, tint dye, dye absorbers of selective wavelengths, electrochromic dyes, stabilizers, flow modifiers, and/or the like) can be blended with matrix material 115 to produce an optically functional film (e.g., inner layer 114).

Outer layers 116, 118 may include a second matrix material 117. In some implementations, second matrix material 117 includes a transparent polycarbonate film (e.g., Lexan PC, and/or the like). Second matrix material 117 may have a higher glass transition temperature (or melt temperature) than first matrix material 115. In some implementations, a thickness of outer layers 116 may be greater than thickness of inner layer 114 to prevent defects from forming during wafer formation; however, in other implementations, inner layer 114 and outer layers 116, 118 may be sized and shaped in any suitable manner. Although outer layers 116, 118 are described a both having the second matrix material 117, in other implementations, one of the outer layers 116, 118 includes second matrix material and the other of the outer layers 116, 118 includes a third matrix material that is different from the second matrix material.

Laminate 112 from first stage 110 is provided to a second stage 120 indicated by arrow 119. At second stage 120, laminate 112 is positioned relative to a tool 122. Tool 122 may be configured to remove (e.g., cut) and/or seal a portion of laminate 112. For example, tool 122 may be configured to cut a circular or oval shaped disk from laminate 112 that forms a wafer 130.

Tool 122 includes a cutting apparatus 124 and an imprinting apparatus 126. In some implementations, tool 122 may include a uniform body that includes cutting apparatus 124 and imprinting apparatus 126 coupled thereto, while in other implementations, the tool may include multiple district components that include or correspond to cutting apparatus 124 and imprinting apparatus 126. For example, tool 122 may include roller (e.g., a cylindrical roller), a planar die, a belt, or other suitable arrangement known in the art.

Cutting apparatus 124 may use heat, chemicals, force (e.g., cutting edge), or any suitable means to remove wafer 130 from laminate 112. For example, cutting apparatus 124 may include a cutting die (e.g., knife die, blanking die,) that cuts an outline pattern (e.g., die pattern) of wafer 130. For example, cutting apparatus 124 may include a plurality of circular die cutters having a sharp edge configured to cut a plurality of wafers (e.g., 130) from laminate 112.

Imprinting apparatus 126 is configured to seal (e.g., via heat and pressure) a portion of laminate 112 and/or wafer 130. To illustrate, imprinting apparatus 126 may apply heat and pressure to one or more circular or ring portions of laminate 112 such that at least a portion of one of the layer (e.g., inner layer 114) is displaced. For example, imprinting apparatus 126 (e.g., heated blunt die) may apply pressure to heated laminate 112 and imprint a shallow annular impression in the laminate sheet to displace a portion of inner layer 114. Imprinting apparatus 126 may generate heat at a temperature greater than a glass transition temperature (e.g., melt point) of inner layer 114 and apply pressure to laminate 112 to displace a portion of the inner layer. In this way, wafer 130 may include a reduced thickness of a center TPU layer (e.g., 114) around an outer edge of the wafer. In some such some implementation, imprinting apparatus 126 may generate heat at a temperature less than a glass transition temperature (e.g., melt point) of outer layers 116 such that only a portion of inner layer 114 is displaced by the imprinting apparatus. For example, imprinting apparatus 126 may include a plurality of circular hot bands having a dull edge configured to compress a circular portion of wafers (e.g., 130) or laminate 112. In some implementations, imprinting apparatus 126 (e.g., dull edge) may be shaped to direct the portion of inner layer 114 in a desired direction (as described further with reference to FIG. 3C).

In some implementations of system 100, imprinting apparatus 126 and cutting apparatus 124 cooperate to form wafer 130. To illustrate, imprinting apparatus 126 may apply heat and pressure to one or more circular portions of laminate 112 and cutting apparatus 124 may then cut the circular portion(s) to produce a wafer (e.g., 130), as described further herein at least with reference to FIG. 2A. Alternatively, cutting apparatus 124 may cut one or more circular portions of laminate 112 to produce wafer 130 and imprinting apparatus 126 may then apply heat and pressure to an outer edge of each wafer 130 to seal an elastomeric layer (e.g., inner layer 114), as described further herein at least with reference to FIG. 4A.

In some implementations, system 100 includes a control device 128, such as a processor and a memory (e.g., a storage device). For example, control device 128 may be coupled to or included in tool 122. Control device 128 (e.g., memory) may be configured to store model data, such as two or three dimensional model data of wafer 130 or optical article 102. For example, model data may include outline data that corresponds to an outline of a wafer 130 that is to be cut from laminate 112. In this way, tool 122 may be configured receive model data corresponding to a desired shape of wafer 130 and interact with laminate 112 to form the wafer, or a plurality of wafers, according to the model data.

Laminate 112 from second stage 120 may be formed into one or more wafers 130 provided to a third stage 140 as indicated by an arrow 139. At third stage 140, an illustrative example of wafer 130 is shown.

Wafer 130 may include a top surface 132 (e.g., a first surface), a bottom surface 134 (e.g., a second surface) and an outer wall 136. Outer wall 136 may extend between top surface 132 and bottom surface 134 of wafer 130. In some implementations, outer wall 136 may intersect with top and bottom surfaces to define a periphery of wafer 130. In some implementations, top surface 132 and bottom surface 134 include or correspond to the top surface and the bottom surface of laminate 112, respectively. For example, wafer 130 may include the same layup (e.g., inner layer 114 and one or more outer layers 116) as described above with reference to laminate 112. To illustrate, inner layer 114 may include a lower surface 137 and an upper surface 138 opposite the lower surface. In such implementations, a first outer layer (e.g., 116) is coupled to lower surface 137 of inner layer 114 and a second outer layer (e.g., 118) is coupled to upper surface 138 of the inner layer. Wafer 130 may be a flat circular disc, however wafer 130 may be sized/shaped in any suitable manner (e.g., elliptical, oval, or otherwise rounded disc) for manufacture of a suitable optical article.

In some implementations, wafer 130 includes a central portion 142 and an outer edge portion 144. Outer edge portion 144 may correspond to a portion of laminate 112 that is contacted by imprinting apparatus 126, at second stage 120. For example, wafer 130 includes an imprint 146 (e.g., a recessed portion) at outer edge portion 144. In some implementations, outer edge portion 144 includes outer wall 136 that defines a periphery of wafer 130. Outer edge portion 144 may surround and cooperate with central portion 142 to define wafer 130. For example, outer edge portion 144 and central portion 142 may be concentric portions of wafer 130 with outer edge portion surrounding the central portion. In some implementations, each layer (e.g., 114, 116, 118) may include a central portion (e.g., 142) and an outer edge portion (e.g., 144) that correspond to the central portion and outer edge portion, respectively, of wafer 130.

In the depicted implementation, central portion 142 includes a first thickness D1 measured from top surface 132 to bottom surface 134 along a straight line that is substantially orthogonal to top and bottom surfaces. Additionally, outer edge portion 144 includes a second thickness D2 measured from top surface 132 to bottom surface 134 along a straight line that is substantially orthogonal to top and bottom surfaces. In some implementations, first thickness D1 of central portion 142 of wafer 130 is greater than second thickness D2 of edge portion 144 of the wafer. For example, first thickness D1 is greater than second thickness D2 by a distance that is greater than or equal to any of, or between any two of, the following: 0.01, 0.02, 0.03, 0.04, and 0.05, 0.06 or more millimeters (mm).

In some implementations, a thickness of at least one of the layers (e.g., 114, 116, 118) of wafer 130 at outer edge portion 144 is less than a thickness of the least one layer at the central portion. For example, as imprinting apparatus 126 may heat wafer 130, matrix material 115 of inner layer 114 may be changed into a viscous state and, upon application of pressure, the matrix material subjected to the pressure is displaced, reducing the thickness of a portion (e.g., imprint 146) of inner layer 114. To illustrate, inner layer 114 may include a third thickness D3 measured from a top surface (e.g., 138) to a bottom surface (e.g., 137) of inner layer 114 along a straight line (e.g., orthogonal to surface 132) at central portion 142 and a fourth thickness D4 measured from the top surface to the bottom surface of the inner layer along a straight line at outer edge portion 144. At third stage 140, fourth thickness D4 may correspond to a height of wafer 130 at imprint 146. In this manner, a thickness of inner layer 114 at outer wall 136 (e.g., D4) may be less than or equal to such that edge bleed (e.g., oozing) of wafer 130 may be reduced or eliminated during formation of the optical article, as described further herein with reference to stage 160. In some implementations, the outer layers of wafer 130 may be, but need not be, pressed together such that at least a portion a first outer layer (e.g., 116) may contact a portion of a second outer layer (e.g., 118).

Wafer 130 from third stage 140 is provided to a fourth stage 150 as indicated by an arrow 149. At fourth stage 150, wafer 130 may be provided to thermoform equipment 151 (e.g., a thermoform chamber) and thermoformed to from a concave wafer 152 that is configured to fit within a mold insert (e.g., 154, 156). For example, wafer 130 may be thermoformed (e.g., via heat and pressure) to a semi-spherical dome shape suitable for use in making optical lenses. In some implementations, wafer 130 may be thermoformed to generate a thermoformed wafer 152 having a concave side and convex side similar to that of optical article 102. To illustrate, thermoformed wafer 152 may be shaped to include or correspond to a desired lens diameter (e.g., between 60 mm and 100 mm), a desired base curve of the lens or base curve of the mold insert 154 (e.g., between 0.25 and 8.50). Wafer 152 includes the same layup as wafer 130. For example, inner layer (e.g., 114) of wafer 152 may have a thickness at outer wall 136 that is less than or equal to a thickness of inner layer at a center of wafer 152. In this way, edge defects (e.g., buckling, crease formation, out-of-plane deformation, or the like) at outer wall 136 may be prevented as wafer 130 is heated and shaped to form wafer 152.

Wafer 130 (e.g., thermoformed wafer 152) from fourth stage 150 is provided to a fifth stage 160 as indicated by an arrow 159. At fifth stage 160, wafer 152 may be disposed within a mold device 161. Mold device may include a mold inserts 154, 156 and a mold block 164. To further illustrate, wafer 152 may be disposed within mold inserts 154, 156 and the mold inserts are subsequently coupled to mold block 164. For example, mold inserts 154, 156 are disposed within a space defined by a sidewall 166 of mold block 164. Mold inserts 154, 156 may be sized and shaped such that when they are coupled together, the inserts cooperate to define a cavity 162 that corresponds to a desired shape of optical article 102. In some implementations, sidewall 166 of mold block 164 may cooperate with mold inserts 154, 156 to define a portion of cavity 162. For example, mold insert 156 may include a convex, concave, or plano surface and mold insert 154 may include a convex, concave, or plano surface having a same, similar, larger or smaller, base curve (e.g., radius of curvature) that define opposing surfaces of a cavity 162.

As shown, moldable material 158 is injected onto the wafer 152 while wafer 152 is positioned within cavity 162. Moldable material 148 may include a transparent or semi-transparent thermoplastic material, such as polycarbonate, thermoplastic urethane, polyacrylate, polyester, copolyester, polymethacrylate, poly(methyl methacrylate), polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof. Moldable material 158 (e.g., matrix material) may be heated, into a liquid form, and injected onto wafer 152. For example, moldable material 158 is injected at a high temperature (up to 300 C) and high pressure (500-30,000 psi) so that the moldable material takes the form of cavity 162 and can then be cooled to solidify. During cooling, moldable material 158 fuses to wafer 152 to form a semi-finished optical article (e.g., 102). Injection of moldable material 158 onto wafer 152 may cause one of the layers (e.g., 114, 116) of the wafer to transform into a low viscous (e.g., liquid) state. For example, moldable material 158 may be injected at a temperature that is much greater than a glass transition temperature of at least one layer (e.g., thermoplastic elastomeric layer) of wafer 152. Specifically, the molten material (e.g., 158) injected into cavity 162 may be injected at a temperature that is greater than the glass transition of matrix material 115 of inner layer 114 such that the inner layer becomes fluid (e.g., a low viscous liquid) and is capable of flowing out under pressure (i.e., oozing out) from wafer 152 onto a surface that defines cavity 162 or between an outer side surface of inserts (e.g., 154, 156) and the walls of the mold block.

In the implementations shown, the reduced thickness of inner layer 114 at outer wall 136 (e.g., D4) prevents matrix material 115 from bleeding out from the outer wall of wafer 152. For example, the thickness D4 of inner layer 114 at outer edge portion 144 limits and/or prevents movement of inner layer 114 at outer wall 136. In this manner, matrix material 115 may be prevented from oozing from wafer 152 or may be slowed such that moldable material 158 is able to contact outer wall 136 before matrix material oozes from the wafer. As a result, moldable material 158 may reach outer wall 136 and encapsulate any liquefied material that oozes out from inner layer 114 of wafer 152 to prevent the liquefied material from contaminating the mold inserts 154, 156 the mold block 164, and/or the space between outer side surfaces of the inserts and sidewall 166. Accordingly, wafer 152 may reduce or eliminate contamination of one or more components (e.g., mold insert 154, mold receiver 156) of system 100, thus allowing easy removal of inserts from the mold block and otherwise decreasing manufacturing time of optical article.

Wafer 152 and moldable material 158 are provided to a sixth stage 170 as indicated by an arrow 169. At sixth stage 170, wafer 152 and moldable material 158 are removed from cavity 162 after solidifying. In some implementations, one or more finishing processes may, but need not be, performed on to wafer 152 and moldable material 158 to form optical article 102. For example, in some implementations, optical article 102 may be subjected to a finishing process, such as, for example, coating, stamping, printing, grinding, polishing, buffing, etching, edging, machining, or another process may occur to produce a finished optical article. As shown, wafer 142 and moldable material 156 are post processed (e.g., edged) to form a shaped lens, however, in other implementations, article 102 will contain a similar shape as cavity 154 (e.g., rounded). As wafer 152 did not contaminate mold inserts 154, 156 or mold block 164, the inserts may be easily removed from the mold block and a second wafer (e.g., 152) may be placed within cavity 162 and a second optical article (e.g., 102) may be formed without cleaning.

In some implementations, control device 128 includes a processor 127 and memory 129. Memory 129 may include read only memory (ROM) devices (e.g., programmable read-only memory (PROM), erasable programmable read-only memory (EPROM), electrically erasable programmable read-only memory (EEPROM), optical storage, or the like), random-access memory (RAM) devices (e.g., synchronous RAM (SRAM), dynamic RAM (DRAM), synchronous dynamic RAM (SDRAM), or the like), one or more HDDs, flash memory devices, SSDs, other devices configured to store data in a persistent or non-persistent state, or a combination of different memory devices. Memory 129 may store instructions that, when executed by processor 127, cause processor 127 to perform, initiate, and/or control the operations described herein. Although described as including processor 127, in other implementations, control device 128 can include application specific integrated circuits (ASIC), field-programmable gate arrays (FPGA), very large scale integrated (VLSI) circuits, or other circuitry. Additionally, control device 128 may include an interface, such as a wired interface or a wireless interface, to enable communication with one or more components of system 100. Control device 128 may also include a user interface to enable a user to control operations of system 100.

Control device 128 may be configured to control operations of one or more components of system 100. For example, control device 128 may control one or more of cutting apparatus 124 and/or imprinting apparatus 126, such as by setting temperatures or pressures applied by cutting apparatus 124 and/or imprinting apparatus 126. As another example, control device 128 may control operation of one or more actuators (not shown) to cause movement (e.g., translation, rotation, and/or the like) of laminate 112, cutting apparatus 124, and/or imprinting apparatus 126. In this way, tool 122, or components thereof, may be operated to engage with laminate 112 to produce wafer 130.

Although described as a single control device (e.g., a single processor), in other implementations, control device 128 may include multiple devices or processors (e.g., a processor system) that perform the control operations. For example, control device 128 may be a distributed system with multiple processors that each perform some of the control operations described herein. To further illustrate, a first device or processor may control operation of cutting apparatus 124 and a second device or processor may control operation of imprinting apparatus 126.

In some implementations, system 100 may include wafer 130, 152 for producing optical article 102. In some implementations, wafer 130, 152 includes laminate 112 having first layer 114 and second layer 116. In such implementations, first layer 114 includes first matrix material 115 having a first surface (e.g., lower surface 137) and a second surface (e.g., an upper surface 138) opposite the first surface. First matrix material (e.g., 115) may include a thermoplastic polyurethane (TPU) resin material. In some such implementations, second layer 116 includes second matrix material 117, and the second layer is coupled to the first layer and covers at least a portion of the first surface or the second surface. A first thickness (D3) at a central portion 142 of first layer 114 is greater than a second thickness (D4) at edge portion 144 of first layer 114.

In some implementations, a glass transition temperature of first matrix material 115 is lower than a glass transition temperature of second matrix material 117. In some such implementations, laminate 112 may include third layer 118 which includes a third matrix material. The second matrix material and the third matric material may include the same material or may include different materials. Second layer 116 may cover at least a portion of the first surface (e.g., 137) of first layer 114. Additionally, third layer 118 may be coupled to first layer 114 and cover at least a portion of the second surface (e.g., 138).

In some of the foregoing implementations, system 100 may be operable for forming optical wafer 102. For example, system 100 may include imprinting apparatus 126 configured to imprint an outline of wafer 130 on laminate sheet 112 and cutting apparatus 124 configured to cut a wafer from laminate sheet 112. In some such implementations, imprinting apparatus 126 includes a sealing band configured to heat and compress edge portion 144 of wafer 130. For example, the sealing band may define an angled surface configured to direct a portion of thermoplastic layer 114 of wafer 130 from edge portion 144 of wafer 130. In some implementations, the sealing band is configured to define annular imprint 146 in laminate sheet 112, and cutting apparatus 124 includes a die cutter configured to cut through laminate sheet 112 at annular imprint 146 to define edge surface 136 of wafer 130.

As another example, in some implementations, system 100 may be configured such that cutting apparatus 124 is configured to cut the wafer from the laminate sheet 112. In such implementations, imprinting apparatus 126 (or another tool) is configured to imprint an outline of wafer 130 to form a recessed portion of the wafer.

Some of the foregoing implementations include a tool 122 for sealing a wafer with a thermoplastic layer for use in an optical article. In some implementations, tool 122 includes imprinting apparatus 126 having a first insert and second insert operable during a sealing operation to apply heat, pressure, or both to wafer 130 and reduce a thickness (D4) of layer 114 of the wafer positioned between the first insert and the second insert.

Thus, system 100 may include tool 122 that engages laminate 112 to form a wafer (e.g., 130) to reduce or eliminate edge bleed. Tool 122 may include a cutting apparatus 124 and/or imprinting apparatus 126 to reduce a thickness of at least one thermoplastic layer of laminate at an outer edge portion (e.g., 144) to prevent contamination during the manufacture of an optical article. Tool 122 may enable mass production of wafers with minimized edge bleed to enable a scalable system for prevention of edge bleeding from thermoplastic based optically functional laminate wafers and subsequent contamination of the mold cavity without sacrificing the cosmetic appearance of the lenses.

Figure 2A:
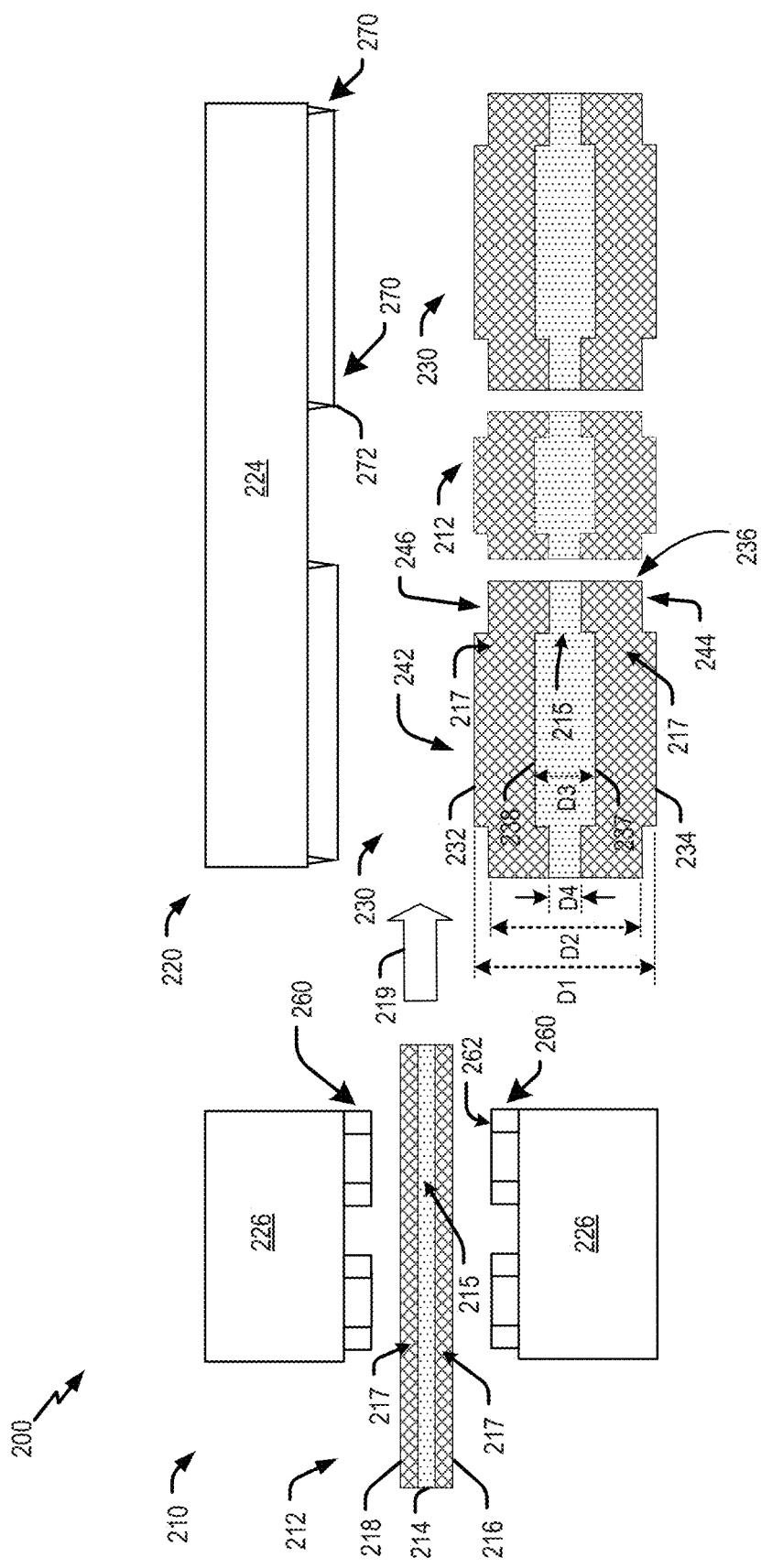
FIG. 2A is another diagram that illustrates an example of a first process for producing a wafer used manufacturing an optical article.
Figure 2B:
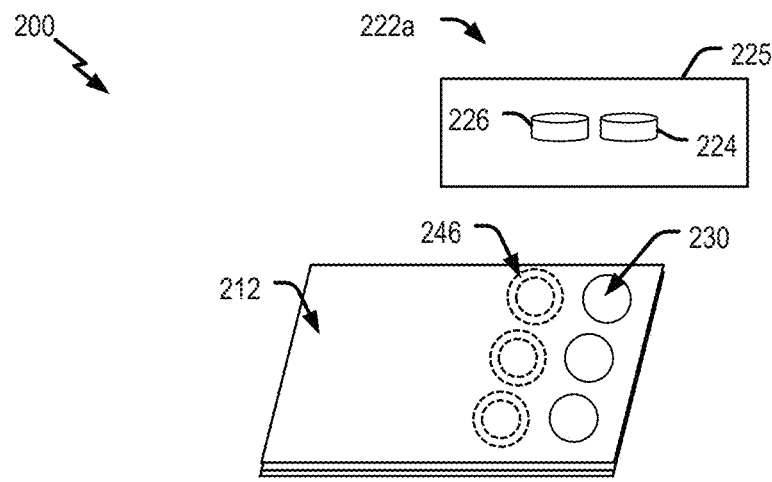
FIG. 2B an illustrative view of an example of a first tool that includes a cutting apparatus and an imprinting apparatus of the optical system.

Referring now to FIG. 2A-2D, aspects for producing an optical wafer—for use in manufacture of an optical article—by a first process are shown. For example, FIG. 2A shows a illustrative diagram of a system 200 for producing a wafer 230 used manufacturing an optical article, FIG. 2B shows an illustrative view of a tool that includes a cutting apparatus 224 and an imprinting apparatus 226, FIG. C are cross-sectional views of various examples of imprinting apparatus 226, and FIG. 2D are cross-sectional views of various examples of cutting apparatus 224. System 200 may include or correspond to system 100. Additionally, wafer 230 may include or correspond to wafer 130.

As shown in FIG. 2A, at a first stage 210, laminate 212 is positioned relative to imprinting apparatus 226. Laminate may include an inner layer 214 having a first matrix material 215 that is disposed between two outer layers 216, 218 having a second matrix material 217. Laminate 212, inner layer 214, and outer layers 216, 218 may include or correspond to laminate 112, inner layer 114, and outer layers 116, 118, respectively. For example, inner layer 214 may include a lower surface 237 and an upper surface 238. Although outer layers 216, 218 are described a both having the second matrix material 217, in other implementations, one of the outer layers 216, 218 includes second matrix material and the other of the outer layers 216, 218 includes a third matrix material that is different from the second matrix material.

As depicted at first stage 210, laminate 212 may be disposed between opposing components of imprinting apparatus 226. However, in in other implementations, imprinting apparatus may be positioned either above or below laminate 212 to produce the annular imprints. Imprinting apparatus 226 may include one or more protrusions 260 configured to interact (e.g., via heat and pressure) with laminate 212 to reduce a thickness of a portion (e.g., 244) inner layer 214. Each protrusion 260 may be shaped based on the desired characteristics of wafer 230. For example, each protrusion 260 may include a surface having a dull edge 262 that is configured to contact laminate 212. Protrusions 260 may be heated and left in contact with laminate 212 for a sufficient time and/or temperature to reduce the viscosity of the center TPU layer (e.g., 214) so that it will flow when compressed. To illustrate, imprinting apparatus 226 may, but need not, include a plurality of annular hot bands (e.g., 260) configured to apply heat and pressure to laminate 212 to create a plurality of annular imprints (e.g., 246) within the laminate. In this way, each protrusion 260 may liquefy a layer (e.g., inner layer 214) of laminate 112 and disperse a portion of the liquefied layer to create a seal within laminate 112. As used herein, annular is not necessarily limited to a circle, but may include another geometry or shape. In some implementations, each protrusion 260 may be sized and shaped in any suitable manner such that imprint 246 corresponds to a diameter of a desired wafer (e.g., 230). For example, the protrusions 260 may be any suitable shape, such as polygonal (e.g., square, rectangular, hexagonal, octagonal, and/or the like), circular, elliptical, an irregular shape, a combination thereof, and/or the like.

Laminate 212 (having imprints) from first stage 110 is provided to a second stage 220 as indicated by arrow 219. At second stage 220, laminate 212 is positioned relative to cutting apparatus 224 configured to remove (e.g., cut) one or more wafers 230 from laminate 212. Wafer 230 may include or correspond to wafer 130, and may include a top surface 232, a bottom surface 234, an outer wall 236, a central portion 242 and an outer edge portion 244 that include or correspond to top surface 132, bottom surface 134, outer wall 136, central portion 142 and outer edge portion 144, respectively. In some implementations, laminate 212 from first stage 110 may be moved from imprinting apparatus toward cutting apparatus 224 at second stage 220 or, alternatively, laminate 212 may remain stationary after interacting with the imprinting apparatus and cutting apparatus may be moved relative to the laminate at second stage 220.

Cutting apparatus 224 may include one or more protrusions 270 configured to interact with laminate 212 to remove a portion (e.g., wafer 230) of the laminate. In some implementations, protrusions 270 may include a surface (e.g., annular surface) having a sharp edge 272. In some implementations, each protrusions 270 may include a diameter that is substantially equal to the diameter of the protrusion (e.g., 260) of imprinting apparatus. For example, a width of protrusions 260 may be greater than or equal to a width of protrusions 270 to create imprints 246 with sufficient width to allow sharp edge 272 to cut through this region and leave outer wall 236 of wafer 230 with little-to-no TPU film. The shape of protrusions 260 and protrusions 270 may include any geometry (e.g., circular, oval, square, rectangular, triangular) and may, but need not, include a pattern along the inside or outside of its circumference to form one or more structural features of wafer 230 such as, for example, a tab, a spur, a notch, combination thereof, or the like.

In some implementations, cutting apparatus 224 may include a plurality of annular die cutters configured to apply force to laminate 212 to remove (e.g., cut) wafer 230 from laminate 212. Accordingly, laminate 212 may be aligned with cutting apparatus 224 such that sharp edge 272 of each protrusion 270 cuts the laminate at imprint 246. In this way, wafer 230 is formed having a thickness (D2) at outer edge portion 244 that is less than a thickness (D1) at central portion 242. As a result, edge bleed (e.g., oozing) of wafer 230 may be reduced or eliminated during a thermoforming or injection molding process to form the optical article. In some implementations, one or more other process may be used to seal outer wall 236 of wafer 230 to further prevent edge bleed. For example, system 200 may include heating outer edge portion 244 to a temperature that is greater than or equal to the temperature of imprinting apparatus 226, ultrasonic welding may be used to seal the top and bottom polycarbonate films (e.g., 116) at outer wall of wafer 230, or the like.

Figure 2C:
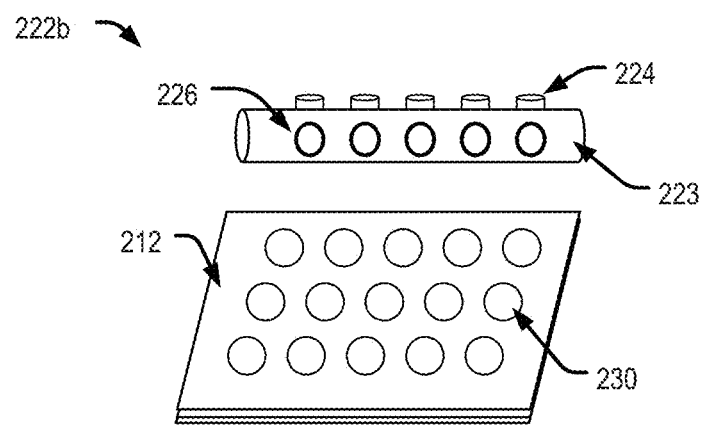
FIG. 2C an illustrative view of an example of a second tool that includes a cutting apparatus and an imprinting apparatus of the optical system.

Referring now to FIGS. 2B and 2C, illustrative examples of a tool 222a-b that includes cutting apparatus 224 and imprinting apparatus 226 is shown. To illustrate, FIG. 2A shows a first example of a tool 222a that is a flat tool (e.g., a planar/stamp tool) and FIG. 2B shows a second example of a tool 222b that is a roller. Tool 222a-b may be used in a continuous roll-to-roll web or roll-to-plate process to form wafer 230. Tool 222a-b may include or correspond to tool 122.

As shown in FIG. 2B, tool 222a includes a plate 225 that is coupled to, or includes, cutting apparatus 224 and imprinting apparatus 226. In some implementations, plate 225 may include a planar surface that can be any suitable geometry (e.g., circular, oval, square, rectangular, triangular). For example, plate 225 may include a first row of a plurality of heated blunt dies (e.g., 260) positioned along a length of the plate and a second row of a plurality of die cutters (e.g., 270) positioned along the length of the plate. A length and/or width of plate 225 may be substantially equal to a length or width of laminate 212 and can be pressed into laminate 212 to create a plurality of imprints using heated blunt dies (e.g., 260) and then further pressed to cut laminate 212 at the plurality of imprints using die cutters (e.g., 270). Laminate 212 or plate 225 may be moved each time plate 225 is pressed into laminate 212 to enable a portion of laminate 212 previously imprinted by the first row of heated blunt dies (e.g., 260) to be aligned with the second row of die cutters (e.g., 270). In this way, plate 225 allows imprinting apparatus 226 and cutting apparatus 224 to contact the same portion of laminate 212 during wafer formation. Although plate 225 is shown having a single row for imprinting and a single row for cutting, plate 225 may include a plurality of respective imprinting and cutting rows to increase the manufacturing time of wafer 230. Additionally, or alternatively, although cutting apparatus 224 and imprinting apparatus 226 are disposed on a single plate (e.g., 225), in other implementations, tool 222a may include multiple plates (e.g., 225) each having a cutting apparatus (e.g., 224) and/or an imprinting apparatus (e.g., 226). In the foregoing implementations, wafers formed using plate 225 may include a thickness (e.g., D4 of inner layer 114) at outer edge portion 244 that is less than a thickness (e.g., D3 of inner layer 114) at central portion 242 to reduce or eliminate edge bleed.

As shown in FIG. 2C, tool 222b includes a cylindrical roller 223 that is coupled to, or includes, cutting apparatus 224 and imprinting apparatus 226. For example, roller 223 may include a first row of a plurality of heated blunt dies (e.g., 260) positioned along a length of the roller and a second row of a plurality of die cutters (e.g., 270) positioned along the length of the roller. Roller 223 may be sized to span a width or a length of laminate 212 and can be rolled along the laminate to create a plurality of imprints using heated blunt dies (e.g., 260) and then further rolled along the laminate to cut the laminate at the plurality of imprints using die cutters (e.g., 270). As shown, cutting apparatus 224 and imprinting apparatus 226 are disposed on a single roller (e.g., 223). In such implementations, the diameter of roller 223, the spacing between first row and second row, size of heated blunt dies (e.g., 260) and die cutters (e.g., 270), the number of wafers to be formed, or other factors may be optimized to allow imprinting apparatus 226 and cutting apparatus 224 may contact the same portion of laminate 212. In other implementations, tool 222b may include multiple cylindrical rollers (e.g., 223). In this way, a first roller may include or correspond to cutting apparatus 224 and a second roller may include or correspond to imprinting apparatus 226 and first and second roller may be rolled independently across laminate 212 to form wafers (e.g., 230). In the foregoing implementations, wafers formed using roller tool 222b may include a thickness (e.g., D4 of inner layer 114) at outer edge portion 244 that is less than a thickness (e.g., D3 of inner layer 114) at central portion 242 to reduce or eliminate edge bleed. With either tool 222a-b, imprinting apparatus 126 is in contact with laminate 212 for a sufficient time at a sufficient temperature for the heat to reduce the viscosity of the center TPU layer (e.g., 114) so that it will flow when compressed.

In some implementations, system 200 may include wafer 230 for producing an optical article (e.g., 102). In some implementations, wafer 230 includes laminate 212 having first layer 214 and second layer 216. In such implementations, first layer 214 includes first matrix material 215 having lower surface 237 and upper surface 238 opposite lower surface 237. In some such implementations, second layer 216 includes second matrix material 217, and second layer 216 is coupled to first layer 214 and covers at least a portion of lower surface 237 or upper surface 238. In some of the foregoing implementations, a first thickness (e.g., D3) at a central portion 242 of first layer 214 (of wafer 230) is greater than a second thickness (e.g., D4) at an edge portion 244 of first layer 214. In some implementations, a glass transition temperature of first matrix material 215 is lower than a glass transition temperature of second matrix material 217. In some such implementations, first matrix material 215 includes a thermoplastic polyurethane (TPU) resin material. Laminate 212 includes a third layer 218 having a third matrix material which may be the same as or different from second matrix material 217. In such implementations, second layer 216 covers at least a portion of lower surface 237 of first layer 214, and third layer 218 is coupled to first layer 214 and covers at least a portion of upper surface 238.

In some of the foregoing implementations, system 200 may be operable for forming an optical wafer. In such implementations, system 200 includes imprinting apparatus 226 configured to imprint an outline of a wafer (e.g., 230) on laminate sheet 212 and cutting apparatus 224 configured to cut wafer 230 from laminate sheet 212. In some such implementations, imprinting apparatus 226 includes a sealing band (e.g., 260) configured to heat and compress an edge portion (e.g., 244) of the wafer. The sealing band 260 may define an angled surface configured to direct a portion of a thermoplastic layer (e.g., 214) of the wafer from the edge portion (e.g., 144) of the wafer. In some implementations, the sealing band 260 is configured to define annular imprint 246 in laminate sheet 212, and cutting apparatus 224 includes a die cutter 270 configured to cut through laminate sheet 212 at annular imprint 246 to define edge surface 236 of wafer 230.

Figure 3A:
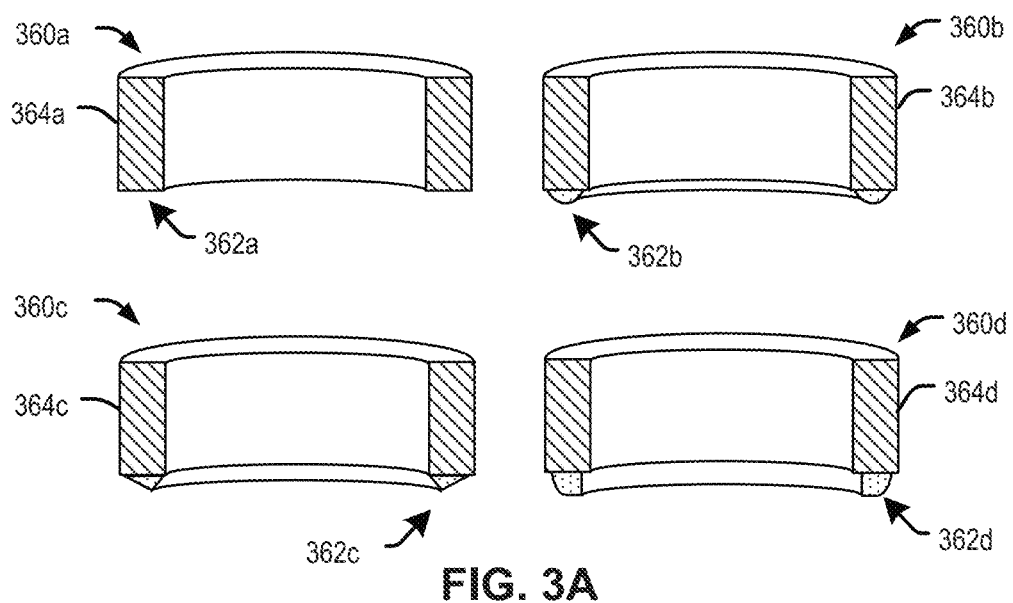
FIG. 3A is a cross-sectional view of various examples of an imprinting apparatus of the optical system.
Figure 3B:
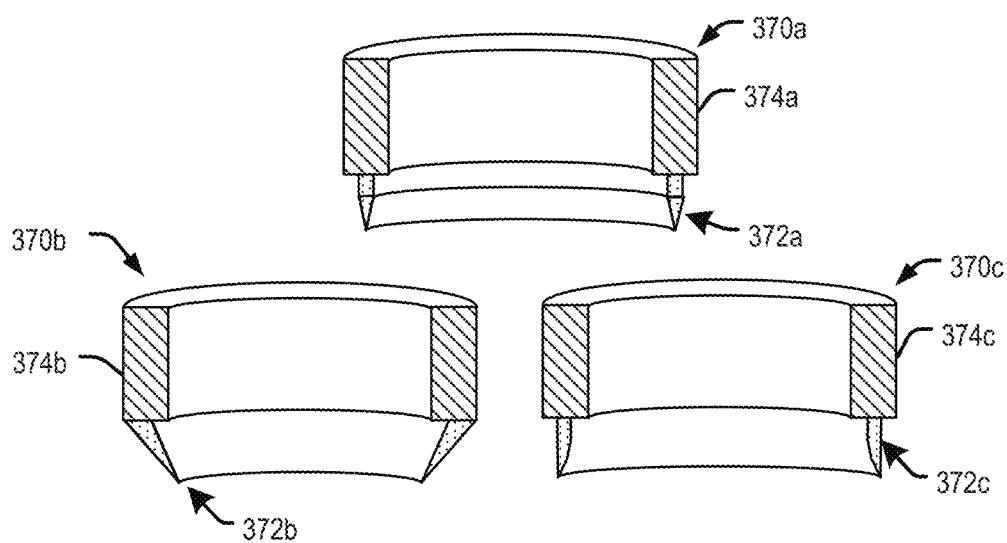
FIG. 3B is a cross-sectional view of various examples of a cutting apparatus of the optical system.

Referring now to FIGS. 3A and 3B, cross-sectional views of one or more components of an imprinting apparatus and a cutting apparatus are shown. For example, FIG. 3A shows a sectional views of protrusions 360a-d of the imprinting apparatus having different dull edges 362a-d (e.g., pressing edges), and FIG. 3B shows a sectional view of protrusions 370a-c of the cutting apparatus having different sharp edges 372a-c (e.g., cutting edges). Imprinting apparatus and cutting apparatus may include or correspond to imprinting apparatus 226, 126 and cutting apparatus 224, 124, respectively.

Imprinting apparatus is configured to engage a portion of a laminate to apply heat and/or pressure to reduce a thickness (e.g., D2) of the portion of the laminate. For example, imprinting apparatus may contact the laminate (e.g., 112, 212) for a sufficient time and at a sufficient pressure and/or temperature to reduce the viscosity of a center TPU layer (e.g., 114) and displace a portion of the center TPU layer where the imprinting apparatus contacts the laminate. In some implementations, imprinting apparatus may include one or more protrusions 360a-d configured to contact the laminate. Each protrusion 360a-d may include an annular body 364 that includes a corresponding dull edge 362a-d that is configured to contact a layer of the laminate without piercing the layer. In some implementations, dull edges 362a-d may include or correspond to a bottom surface of a corresponding annular body 364a-d. While depicted in conjunction with annular body 364a-d, each of dull edge 362a-d may be coupled to any other suitable component of imprinting apparatus with similar functionality.

As shown in FIG. 3A, protrusion 360a includes a dull edge 362a that corresponds to a planar bottom surface of annular body 364a. In other implementations, a dull edge may extend from a bottom surface of an annular body to guide a molten layer inside the laminate when contacted by the protrusion. To illustrate, protrusion 360b includes an annular body 364b that has a dull edge 362b that is rounded and extends from a bottom surface of the annular body. In this way, dull edge (e.g., 362b) may apply force to the laminate without piercing an outer layer of the laminate. As shown, dull edge 362a, 362b is symmetrical to evenly distribute a viscous layer of the laminate. However, in other implementations, dull edge (e.g., 362c, 362d) is asymmetrical to direct a molten layer in a certain direction. For example, protrusion 360c includes an annular body 364c having a dull edge 362c that is angled toward an outer surface of annular body 364c to guide a molten layer away from a center of protrusion 360c. Dull edge 362c includes a straight portion that is angled away from protrusion 360c, while in other implementations, a protrusion 360d includes an annular body 364d having a dull edge 362d that is curved toward an outer surface of annular body 364d. In this way, the shape of dull edge (e.g., 362c-d) can be designed such that a TPU layer flows away from a center of a wafer and the excess TPU ends up in a residual (e.g., scrap) portion of the laminate.

Referring now to FIG. 3B, a sectional view of protrusions 370a-c of the cutting apparatus having different sharp edges 372a-c are shown. Each protrusion 370a-c may include a corresponding annular body 374a-c and a corresponding sharp edge 372a-c that is configured to cut through at least a portion of a laminate. Each sharp edge 372*a-c* may be sized such that a contact point of the sharp edge provides sufficient pressure to pierce the laminate. For example, protrusion 370*a* may include an annular body 374*a* having a sharp edge 372*a* that extends from a bottom surface of annular body 374*a*. Sharp edge 372*a* is symmetrical to cut a portion of the laminate. However, in other implementations, sharp edge 372*b*, 372*c* may be asymmetrical to achieve a particular purpose such as, for example, creating angled wafers, cutting through specific multi-layer laminate constructions (e.g., sort, hard, or combination), or other suitable purpose known in the art. For example, protrusion 370*b* includes an annular body 374*b* having a sharp edge 372*b* that is angled relative to the bottom surface of annular body 374*b*, and protrusion 370*c* includes an annular body 374*c* having a sharp edge 372*c* that is angled toward an outer surface of annular body 374*c*. While depicted in conjunction with annular body 374*a-c*, sharp edges 372*a-c* may be coupled to any other suitable component of cutting apparatus with similar functionality.

Figure 4A:
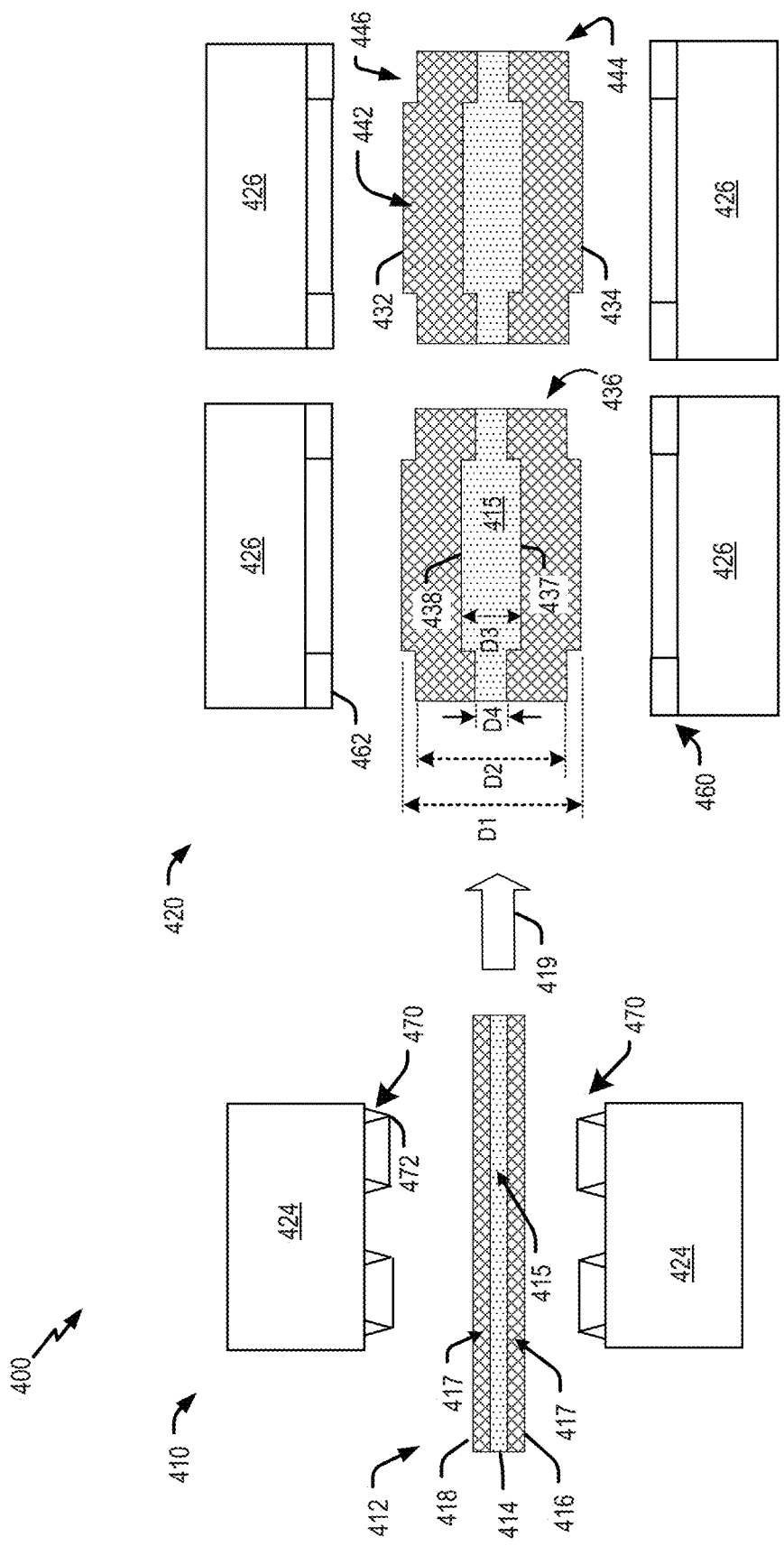
FIG. 4A is another diagram that illustrates an example of a second process for producing a wafer used manufacturing an optical article.
Figure 4B:
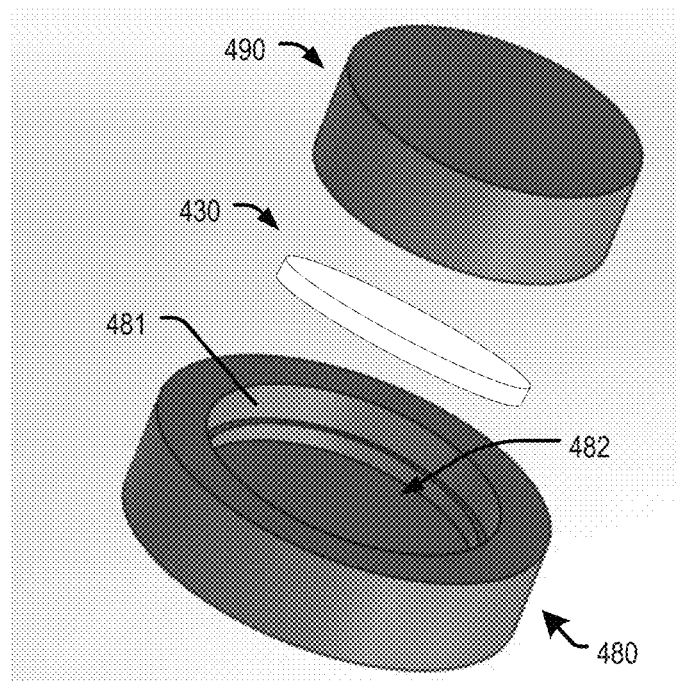
FIG. 4B is a perspective view of an example of a sealing apparatus of the optical system.
Figure 4C:
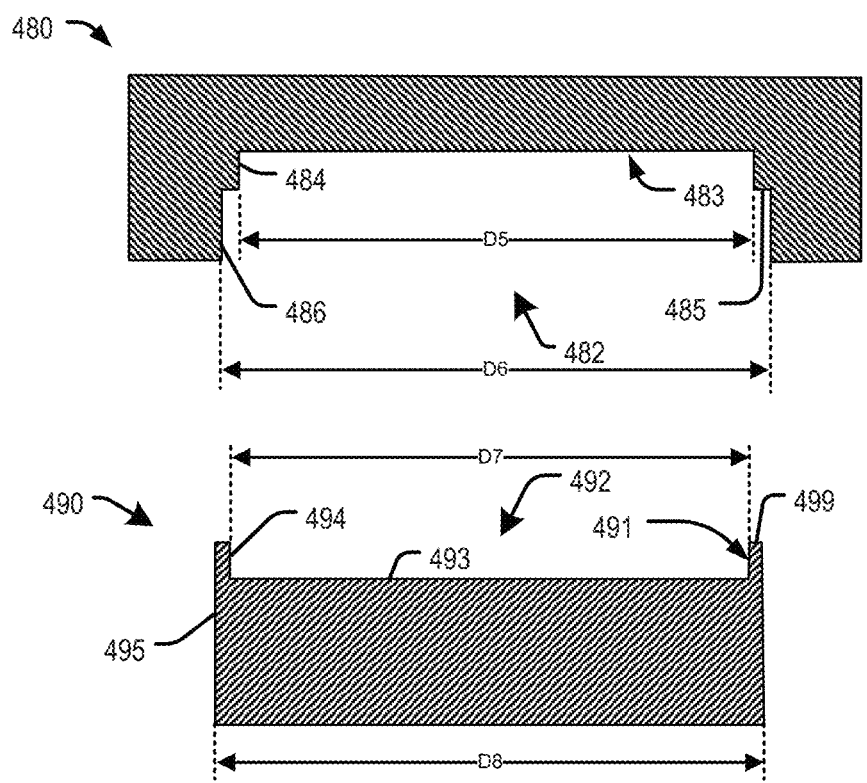
FIG. 4C is a side cross-sectional view of the sealing apparatus of FIG. 4B.

Referring now to FIG. 4A-4C, aspects of producing an optical wafer—for use in manufacture of an optical article—by a second process is shown. For example, FIG. 4A shows an illustrative diagram of a system 400 for producing a wafer 430 used in manufacturing an optical article (e.g., 102), FIG. 2B shows a perspective view of an example of an imprinting apparatus 426 used in system 400, and FIG. 4C shows a cross-sectional view of imprinting apparatus 426 in use with a wafer 430.

As shown in FIG. 4A, at a first stage 410, laminate 412 is positioned relative to a cutting apparatus 424 of tool (e.g., 120). Laminate may include an inner layer 414 having a first matrix material 415 that is disposed between two outer layers 416, 418 having a second matrix material 417. Although outer layers 416, 418 are described a both having the second matrix material 417, in other implementations, one of the outer layers 416, 418 includes second matrix material and the other of the outer layers 416, 418 includes a third matrix material that is different from the second matrix material 417. Laminate 412, inner layer 414, and outer layers 416 may include or correspond to laminate 112, 212, inner layer 114, 214, and outer layers 116, 118, respectively. Inner layer 414 may include a lower surface 437 and an upper surface 438.

As depicted at first stage 410, laminate 412 may be disposed between opposing components of cutting apparatus 424. However, in in other implementations, cutting apparatus 424 may be positioned either above or below laminate 412. Cutting apparatus 424 may include one or more protrusions 470 configured to interact with laminate 412 to remove a portion (e.g., wafer 430) of the laminate. In some implementations, protrusions 470 may include a surface (e.g., annular surface) having a sharp edge 472 configured to pierce laminate 412 to remove one or more wafers 430 from the laminate. For example, protrusions 470 may include or correspond to cutting apparatus 124 and/or protrusion 370*a-c*.

Wafer 430 may include or correspond to wafer 130, and may include a top surface 432, a bottom surface 434, an outer wall 436, a central portion 442 and an outer edge portion 444 that include or correspond to top surface 132, bottom surface 134, outer wall 136, central portion 142 and outer edge portion 144, respectively. As shown at first stage 410, wafers 430 produced by cutting apparatus 424 are circular, but may be any suitable geometry, such as polygonal (e.g., square, rectangular, hexagonal, octagonal, and/or the like), circular, elliptical, an irregular shape, a combination thereof, and/or the like.

Wafers 430 from first stage 410 are provided to a second stage 420 indicated by arrow 419. At second stage 420, laminate 112 is positioned relative to an imprinting apparatus 426 that is configured to interact (e.g., via heat and pressure) with wafer 230 to reduce a thickness of a portion (e.g., outer edge portion 444) of the wafer. In some implementations, wafers 430 from first stage 410 may be moved from cutting apparatus 424 toward imprinting apparatus 426 at second stage 420 or, alternatively, wafers 430 may remain stationary after interacting with the cutting apparatus 424 and imprinting apparatus 426 may be moved relative to the wafers at second stage 420.

Imprinting apparatus 426 may be positioned above laminate 412, below the laminate, or both to produce imprints 446 on wafer 430. Imprinting apparatus 426 may be heated and left in contact with wafer 430 for a sufficient time, pressure, and/or temperature to reduce the viscosity of a center TPU layer (e.g., 114) so that it will flow when compressed. For example, imprinting apparatus 426 may include one or more protrusions 460 having a dull edge 462 that is configured to contact laminate 412 to reduce a thickness of a portion (e.g., 244) inner layer 214. Protrusions 460 may include or correspond to imprinting apparatus 426 and/or protrusions 360*a-d*. Each protrusion 260 may be shaped based on the desired characteristics of wafer 230. In this way, imprinting apparatus 426 may apply pressure to outer edge portion 444 of wafer 430 to decrease a thickness of the center TPU layer (e.g., 114) to create a seal at outer wall 436 of the wafer. As a result, edge bleed (e.g., oozing) of wafer 230 may be reduced or eliminated during a subsequent thermoforming or injection molding process. In some implementations, one or more other process may be used to seal outer wall 436 of wafer 430 to further prevent edge bleed. For example, system 400 may include heating outer edge portion 444 to a temperature that is greater than or equal to the temperature of imprinting apparatus 426, ultrasonic welding may be used to seal the top and bottom polycarbonate films (e.g., 416) at outer wall of wafer 430, or the like.

Referring now to FIGS. 4B and 4C, views of an example of imprinting apparatus 426 are shown. To illustrate, FIG. 4B shows a perspective view of imprinting apparatus 426 and FIG. 4C shows a cross-sectional view of imprinting apparatus 426. As shown, imprinting apparatus 426 is configured to engage a single wafer (e.g., 430), however, it should be understood that imprinting apparatus 426 may be configured to seal a plurality of wafers (e.g., 430) to facilitate efficient manufacture of the wafers.

Imprinting apparatus 426 may include a first insert 480 and a second insert 490 configured to cooperate to seal wafer 430. First insert 480 may be configured to receive a first portion of wafer 430 (e.g., from cutting apparatus 424) and second insert 490 may be configured to receive a second portion of the wafer. In this way, first and second inserts 480, 490 may engage wafer 430 to decrease a thickness of at least one layer (e.g., 414) of wafer 430 to prevent edge bleed during subsequent manufacturing processes.

First insert 480 includes a first inner surface 481 that defines a cavity 482 configured to receive a portion of wafer 430. As shown, first inner surface 481 includes a base 483, a first sidewall 484, a second sidewall 486, and a ledge 485 (e.g., a surface) that extends between the first sidewall and the second sidewall. First sidewall 484 corresponds to a first diameter D5 and extends from base 483 to define a first portion of cavity 482. Second sidewall 486 corresponds to a second diameter D6 that is greater than first diameter D5 to form ledge 485 that extends laterally between first and second sidewalls 484, 486. In some implementations, second sidewall 486 defines a second portion of cavity 482 that defines an opening of the cavity 482. In some implementations, first diameter D5 is less than a diameter of wafer 430 so that an outer surface (e.g., 132, 134) of the wafer contacts ledge 485 while the wafer is disposed within cavity 482. Accordingly, ledge 485 (in conjunction with surface 499 of second insert 490) may apply pressure to wafer 430 at outer edge portion 444 of bottom surface 134 to reduce a thickness of at least one layer of the wafer at the outer edge portion 444.

Second insert 490 includes a second inner surface 491 and an outer surface 495. Second inner surface 491 includes a base 493 and a third sidewall 494 that cooperate to define a second cavity 492 configured to receive a second portion of wafer 430. Third sidewall 494 may extends away from base 493 and define an opening of cavity 492. In some implementations, third sidewall 494 corresponds to a third diameter D7 that may be, but need not be, equal to or substantially equal to first diameter D5. Outer surface 495 corresponds to a fourth diameter D8 that is greater than first diameter D5 and third diameter D7, and is less than second diameter D6. Accordingly, second insert 490 is able to be disposed within the portion of cavity 482 defined by second sidewall 486 and may apply pressure to wafer 430 at outer edge portion 444 of top surface 132 to reduce a thickness of at least one layer of the wafer at the outer edge portion 444. In this manner, first insert 480 and second insert 490 may be positionable to seal a central TPU layer (e.g., 114) and prevent edge bleed during subsequent manufacturing processes.

In some implementations, system 400 may include a wafer (e.g., 130, 430) for producing an optical article (102). In some implementations, the wafer (e.g., 430) includes a laminate 412 having a first layer (e.g., 414) and a second layer (e.g., 416). In such implementations, first layer includes first matrix material 415 having lower surface 437 and upper surface 438 opposite the lower surface 437. In some such implementations, second layer (e.g., 416) includes second matrix material 417, and the second layer is coupled to the first layer and covers at least a portion of lower surface 437 or upper surface 438. In some of the foregoing implementations, a first thickness (e.g., D3) at a central portion (e.g., 442) of the first layer (e.g., 414) that is greater than a second thickness (e.g., D4) at an edge portion (e.g., 444) of the first layer. In some implementations, a glass transition temperature of first matrix material 415 is lower than a glass transition temperature of second matrix material 417. In some such implementations, first matrix material 415 includes a thermoplastic polyurethane (TPU) resin material. Laminate 412 includes a third layer (e.g., 418) having a third matrix material. In such implementations, second layer (e.g., 416) covers at least a portion of lower surface 437 of first layer (e.g., 414) and third layer (e.g., 418) is coupled to the first layer (e.g., 414) and covers at least a portion of upper surface 438.

In some of the foregoing implementations, system 400 may be operable for forming an optical wafer (e.g., 102). In such implementations, system 400 includes cutting apparatus 424 configured to cut a wafer (e.g., 430) from laminate 412, such as a laminate sheet, and imprinting apparatus 426 configured to imprint the wafer. In some such implementations, imprinting apparatus 426 includes a sealing band (e.g., 260, 362*a-d*, 460) configured to heat and compress an edge portion (e.g., 444) of the wafer. The sealing band may define an angled surface configured to direct a portion of a thermoplastic layer (e.g., 414) of the wafer from the edge portion (e.g., 144) of the wafer.

In some implementations, system 400 includes a tool (e.g. 426) configured to seal a wafer with a thermoplastic layer for use in an optical article (e.g., 102). Tool (e.g., 426) includes first insert 480 including first inner surface 481 configured to contact a first surface (e.g., 432) of a wafer (e.g., 430). First inner surface defines a first opening of a first cavity (e.g., 482) configured to receive a first portion of a wafer. Tool (e.g., 426) includes second insert 490 having second inner surface 491 configured to contact a second surface (e.g., 434) of the wafer (e.g., 430). Second inner surface 491 defines a second opening of a second cavity (e.g., 492) configured to receive a second portion of a wafer. In some such implementations, during a sealing operation, first insert 480 and second insert 490 are configured to apply heat, pressure, or both to the wafer and reduce a thickness of a layer (e.g., 114) of the wafer (e.g., 430) positioned between first inner surface 481 of first insert 480 and second inner surface 491 of second insert 490. In some of the foregoing implementations, first inner surface 481 defines or includes first sidewall 484 corresponding to a first diameter (e.g., D5) and second sidewall 486 corresponding to second diameter (e.g., D6) that is greater than the first diameter. In some implementations, ledge 485 (e.g., a surface) extends between first sidewall 484 and second sidewall 486. In some implementations, second inner surface 491 defines or includes third sidewall 494 corresponding to a third diameter (e.g., D7) that is substantially equal to the first diameter (e.g., D5). Second insert 490 further includes outer surface 495 that corresponds to a fourth diameter (e.g., D8) that is substantially equal to the second diameter (e.g., D7). In some implementations, during the sealing operation, first surface 432 of the wafer is in contact with ledge 485 and the first and second inserts 480, 490 are configured to compress an outer edge portion (e.g., 444) of the wafer (e.g., 430) to reduce the thickness of the layer of the wafer at the outer edge portion.

Figure 5:
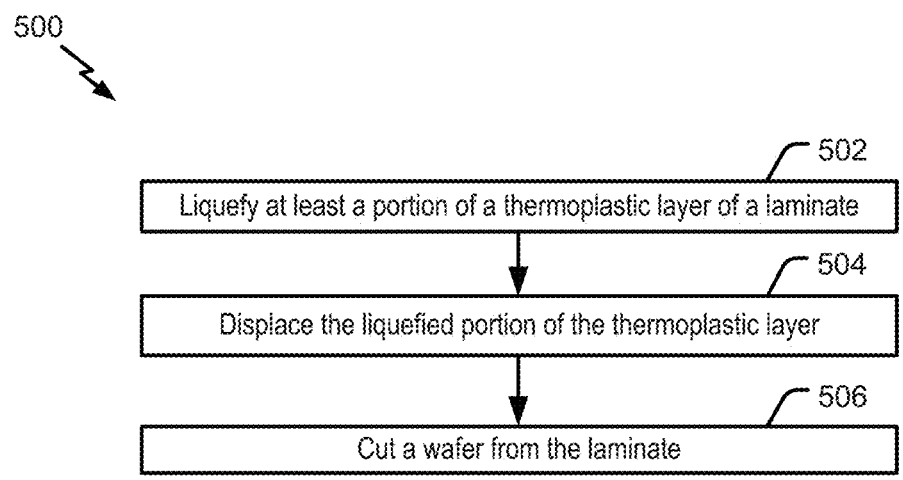
FIG. 5 is a flowchart illustrating an example of a method of forming a wafer of the optical system.

Referring to FIG. 5, an example of a method of forming one or more wafers is shown. Method 500 may be performed by one or more components as described with reference to FIG. 1, 2A-2C, 3A, 3B, or 4A-4C. For example, method 500 may be performed by one or more components of systems 100, 200, 400.

Method 500 includes liquefying at least a portion of a thermoplastic layer of a laminate, at 502. Laminate may include or correspond to laminate 112, 212, 412. For example, the liquefied portion of the thermoplastic layer may include or correspond to inner layer 114, 214, 414. In some implementations, an imprinting apparatus (126, 226, 426) may be utilized to liquefy the portion of the thermoplastic layer. In some implementations, liquefying the at least the portion of the thermoplastic layer of the laminate includes heating the at least the portion of a thermoplastic layer of the laminate. Additionally, or alternatively, liquefying the at least the portion of the thermoplastic layer of the laminate includes applying pressure to the at least the portion of a thermoplastic layer of the laminate.

Method 500 further includes displacing the liquefied portion of the thermoplastic layer, at 504. For example, an imprinting apparatus may apply pressure to an annular portion of the laminate to displace the liquefied portion of inner layer (114, 214, 414) to reduce a thickness of the laminate at the annular portion.

Method 500 also includes cutting a wafer from the laminate, at 506. Wafer may include or correspond to wafer

130, 230, 430. In some implementations, a cutting apparatus (124, 224, 424) may be utilized to cut a wafer from the laminate. To illustrate, cutting apparatus (124, 224, 424) may apply a force to an annular portion of the laminate to produce the wafer from the laminate. In some implementations, cutting the wafer from the laminae may be performed subsequent to or prior to liquefying and/or displacing. To illustrate, some implementations, cutting the wafer includes cutting the laminate to define an outer edge of the wafer.

In some of the foregoing implementations, displacing the liquefied portion of the thermoplastic layer includes compressing the portion of the thermoplastic layer of the laminate. In some such implementations, compressing the portion of the thermoplastic layer of the laminate displaces the liquefied portion in a direction outward from a center of the wafer.

In some implementations of method 500, cutting the wafer occurs subsequent to displacing the liquefied portion of the thermoplastic layer. However, in other implementations of method 500, displacing the liquefied portion of the thermoplastic layer occurs subsequent to cutting the wafer. Some of the foregoing methods include a step of sealing a sidewall of the wafer. Some methods may include thermoforming the wafer and, in some such methods, placing the thermoformed wafer into a mold cavity to form an optical article.

Thus, method 500 may produce a wafer that may reduce or eliminate edge bleed. Method 500 may liquefy a portion of a thermoplastic layer of a laminate and displace the liquefied portion of the thermoplastic layer to form a wafer having a reduced thickness of the thermoplastic layer of laminate at an outer edge portion to prevent contamination during the manufacture of an optical article. Method 500 may enable mass production of wafers with minimized edge bleed to enable a scalable system for prevention of edge bleeding from thermoplastic based optically functional laminate wafers and subsequent contamination of the mold cavity without sacrificing the cosmetic appearance of the lenses.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this disclosure. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for forming an optical wafer, the system comprising:
   an imprinting apparatus configured to imprint an outline of the optical wafer on a laminate sheet, the imprinting apparatus comprising:
      a sealing band configured to heat and compress an edge portion of the optical wafer, and
      a cutting apparatus configured to cut the optical wafer from the laminate sheet,
   wherein the sealing band comprises a tool comprising:
      a first insert comprising a first inner surface configured to contact a first surface of the optical wafer,
      the first inner surface defining a first opening of a first cavity configured to receive a first portion of the optical wafer, and
      a second insert comprising a second inner surface configured to contact a second surface of the optical wafer, the second inner surface defining a second opening of a second cavity configured to receive a second portion of the optical wafer,
   wherein, during a sealing operation, the first insert and the second insert are configured to:
      apply one or more of heat and pressure to the optical wafer, and
      reduce a thickness of a layer of the optical wafer positioned between the first inner surface of the first insert and the second inner surface of the second insert.

2. The system of claim 1, wherein the sealing band defines an angled surface that is configured to direct a portion of a thermoplastic layer of the optical wafer from the edge portion of the optical wafer.

3. The system of claim 1, wherein the sealing band is configured to define an annular imprint in the laminate sheet, the annular imprint having a first diameter, and
   the cutting apparatus comprises a die cutter configured to cut through the laminate sheet at the annular imprint to define an edge surface of the wafer.

4. The system of claim 1, wherein the first inner surface defines:
   a first sidewall having a first diameter,
   a second sidewall having a second diameter that is greater than the first diameter, and
   a ledge extending between the first sidewall and the second sidewall,
   the second inner surface defines a third sidewall having a third diameter that is substantially equal to the first diameter, and
   the second insert further comprises an outer surface that has a fourth diameter that is substantially equal to the second diameter.

5. The system of claim 4, wherein, during the sealing operation:
   the first surface of the optical wafer is in contact with the ledge, and
   the first insert and the second insert are configured to compress an outer edge portion of the optical wafer to reduce the thickness of the layer of the optical wafer at the outer edge portion.

* * * * *